United States Patent
Nagashima et al.

(10) Patent No.: US 8,344,700 B2
(45) Date of Patent: Jan. 1, 2013

(54) CHARGING METHOD AND CHARGER (75) Inventors: Takeaki Nagashima, Osaka (JP);
Yoshiyuki Nakatamari, Osaka (JP)

(73) Assignee: Panasonic Corporation, Osaka (JP)

( * ) Notice: Subject to any disclaimer, the term of this patent is extended or adjusted under 35 U.S.C. 154(b) by 322 days.

(21) Appl. No.: 12/680,051

(22) PCT Filed: Mar. 3, 2009

(86) PCT No.: PCT/JP2009/000949
§ 371 (c)(1),
(2), (4) Date: Mar. 25, 2010

(87) PCT Pub. No.: WO2009/110221
PCT Pub. Date: Sep. 11, 2009

(65) Prior Publication Data
US 2010/0194351 A1  Aug. 5, 2010

(30) Foreign Application Priority Data
Mar. 3, 2008  (JP) ................................. 2008-051786

(51) Int. Cl.
*H02J 7/04* (2006.01)
(52) U.S. Cl. ...................................................... 320/152
(58) Field of Classification Search ........... 320/137–165
See application file for complete search history.

(56) References Cited

U.S. PATENT DOCUMENTS

| | | | |
|---|---|---|---|
| 6,124,700 A | 9/2000 | Nagai et al. | |
| 6,459,239 B1 * | 10/2002 | Price | 320/130 |
| 2008/0030171 A1 * | 2/2008 | Villefrance et al. | 320/150 |

FOREIGN PATENT DOCUMENTS

| | | |
|---|---|---|
| JP | 5-88154 | 11/1993 |
| JP | 9-56080 | 2/1997 |
| JP | 9-147921 | 6/1997 |
| JP | 11-018314 | 1/1999 |
| JP | 2002-051478 | 2/2002 |
| JP | 2004-364387 | 12/2004 |

* cited by examiner

*Primary Examiner* — Melissa Koval
*Assistant Examiner* — Daniel Miller
(74) *Attorney, Agent, or Firm* — McDermott Will & Emery LLP (57) ABSTRACT

A charging method for charging a secondary battery includes the steps of: (a) performing constant-current charging with a first current; and (b) when a voltage of a secondary battery reaches a first voltage, performing constant-voltage charging at the first voltage. When a temperature of the secondary battery is equal to or higher than a reference temperature in step (a), step (b) includes the steps of (b1) when the voltage of the secondary battery reaches a second voltage lower than the first voltage, performing constant-voltage charging at the second voltage, (b2) after step (b1) and when the temperature of the secondary battery falls below the reference temperature, performing charging with a second current, and (b3) when the voltage of the secondary battery reaches the first voltage, performing constant-voltage charging at the first voltage.

5 Claims, 7 Drawing Sheets

CHARGING METHOD AND CHARGER

RELATED APPLICATIONS

This application is the U.S. National Phase under 35 U.S.C. §371 of International Application No. PCT/JP2009/000949, filed on Mar. 3, 2009, which in turn claims the benefit of Japanese Application No. 2008-051786, filed on Mar. 3, 2008, the disclosures of which Applications are incorporated by reference herein.

TECHNICAL FIELD

The present disclosure relates to charging methods and chargers for secondary batteries, and more particularly to a charging method and a charger for controlling charging based on the battery temperature.

BACKGROUND ART

The market for portable electronic devices, such as portable audio devices and digital still cameras, have rapidly grown in recent years. With this trend, secondary batteries, which can be reused by charging them, have come to play an important role in supplying power to such portable electronic devices. Among these batteries, secondary batteries which are to be used as drive power sources for electronic devices are required to increase their capacity in order to increase the operating time of the electronic devices.

The increase in the capacity of a secondary battery, however, greatly affects the safety of the secondary battery. Specifically, to charge the secondary battery, the secondary battery is fitted to a charger. At this time, heat generated from the charger or heat generated by the secondary battery itself causes the temperature of the secondary battery to rise above an ambient temperature. The extent of this temperature rise is generally about 10° C. When the capacity of the secondary battery is increased, however, the extent of the temperature rise increases accordingly. Thus, when a strong shock or the like is applied from outside to a fully charged secondary battery having an increased temperature, for example, this secondary battery might abnormally generate heat. Such a phenomenon might also occur when the secondary battery is charged at a high ambient temperature.

To solve the above problem, Patent Document 1 discloses the following method. In this method, to charge a battery safely, the temperature of a secondary battery which is being charged is monitored such that when the temperature of the secondary battery exceeds a given temperature, charge current is switched to a small value, thereby suppressing a temperature rise of the secondary battery which is being charged.

Patent Document 2, for example, discloses a method for controlling charging with charge current and charge time adjusted based on a detected temperature of a secondary battery.

CITATION LIST

Patent Document

PATENT DOCUMENT 1: Japanese Patent Application No. 2004-364387
PATENT DOCUMENT 2: Japanese Patent Application No. 11-18314

SUMMARY OF THE INVENTION

Technical Problem

In the charging method disclosed in Patent Document 1, however, charge current is switched to a small value during charging, resulting in a problem of an increase in time necessary for completing the charging.

It is therefore a primary object of the present invention to provide a charging method with which charging can be performed safely and a sufficient charge capacity can be assured even in the case of an excessive temperature rise of a secondary battery which is being charged.

Solution to the Problem

In an aspect of the present invention, a charging method for charging a secondary battery includes the steps of: (a) performing constant-current charging with a first current; and (b) when a voltage of a secondary battery reaches a first voltage, performing constant-voltage charging at the first voltage, wherein when a temperature of the secondary battery is equal to or higher than a reference temperature in step (a), step (b) includes the steps of (b1) when the voltage of the secondary battery reaches a second voltage lower than the first voltage, performing constant-voltage charging at the second voltage, (b2) after step (b1) and when the temperature of the secondary battery falls below the reference temperature, performing charging with a second current, and (b3) when the voltage of the secondary battery reaches the first voltage, performing constant-voltage charging at the first voltage.

The method preferably further includes the step of stopping charging between steps (b1) and (b2).

A difference between the first voltage and the second voltage is preferably in the range from 0.1 V to 0.2 V.

Preferably, the secondary battery is a lithium ion secondary battery, the first voltage is 4.2 V, and the second voltage is 4.1 V.

In an aspect of the present invention, a charger for charging a secondary battery is a charger for charging a secondary battery with the charging method described above, and includes: a power supply circuit configured to perform constant-current charging with a first current, and when a voltage of the secondary battery reaches a first voltage, perform constant-voltage charging at the first voltage; and a charging controller configured to control charging by the power supply circuit, wherein the charging controller includes a monitor configured to monitor a temperature of the secondary battery, and a switch configured to switch a charge voltage in constant-voltage charging between the first voltage and a second voltage lower than the first voltage, based on the temperature of the secondary battery detected by the monitor, and during the constant-current charging with the first current, when the temperature of the secondary battery detected by the monitor is equal to or higher than a reference temperature, the switch allows constant-voltage charging to be performed at the second voltage, then when the temperature of the secondary battery falls below the reference temperature, charging is performed with a second current, and then when the voltage of the secondary battery reaches the first voltage, the switch allows constant-voltage charging to be performed at the first voltage.

Advantages of the Invention

With the charging method according to the present invention, even with an excessive temperature rise of a secondary battery which is being charged, it is possible to charge the battery without compromising the safety, while ensuring a sufficient charge capacity.

DESCRIPTION OF REFERENCE CHARACTERS 1 charger
2 battery pack
3 secondary battery
4 thermistor
5 control IC
10 power supply circuit
11 constant-current circuit
12 constant-voltage circuit
13 charging controller
14 monitor
15 switch

DESCRIPTION OF EMBODIMENTS

Figure 1:
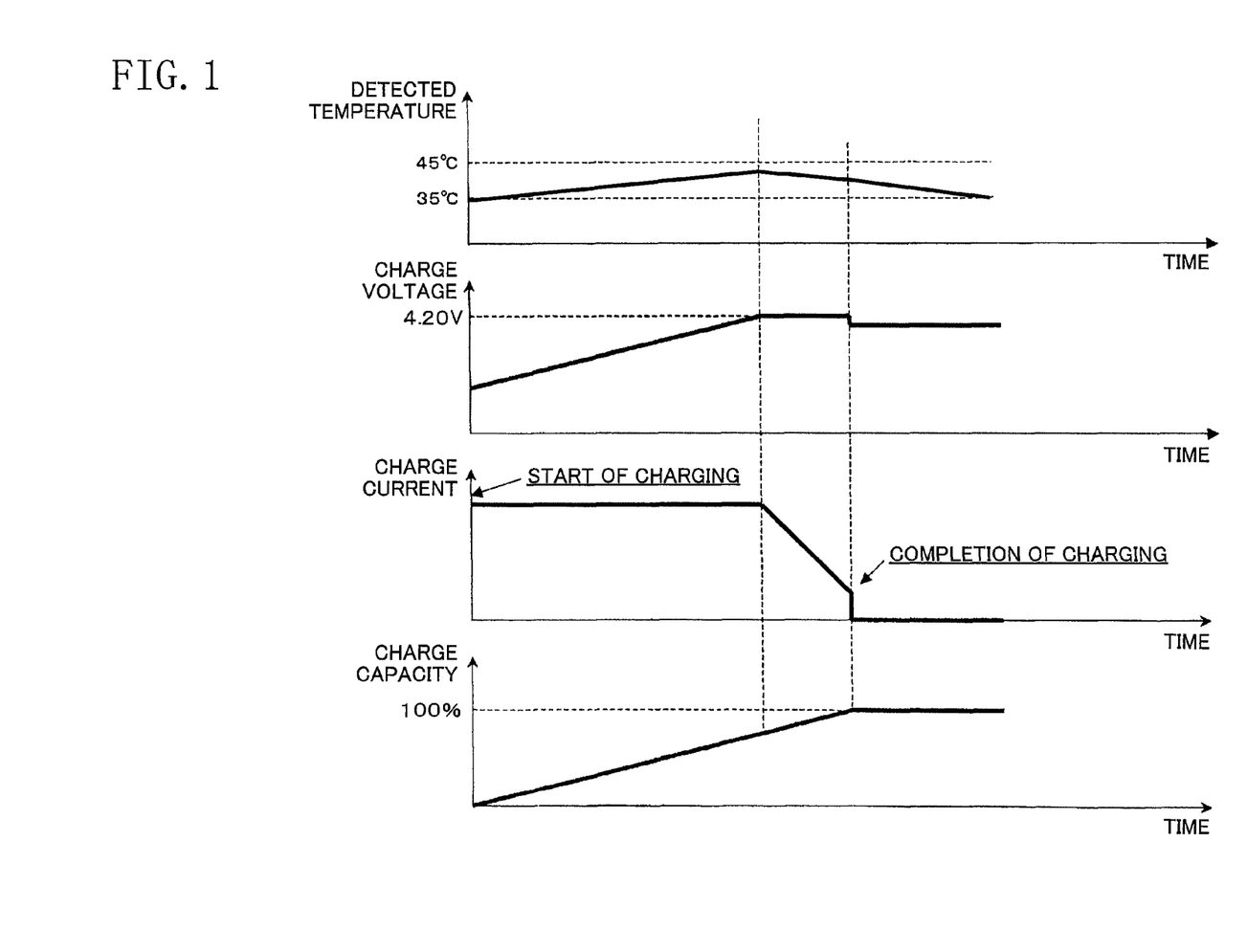
FIG. 1 shows graphs respectively showing changes in charge current, charge voltage, detected temperature of a secondary battery, and charge capacity after the start of charging and before the completion of the charging in a conventional charging method.

Prior to describing an embodiment of the present invention, a conventional charging method for a secondary battery will be described with reference to FIG. 1. FIG. 1 shows graphs respectively showing changes in charge current, charge voltage, detected temperature of a secondary battery, and charge capacity after the start of charging and before the completion of the charging.

As shown in FIG. 1, constant-current charging in which charging is performed with a constant current is performed in an initial period after the start of charging. Then, the charge capacity gradually increases, and once the voltage of the secondary battery reaches a maximum voltage which is previously set (and which is typically 4.2 V in a case of, for example, a lithium ion battery), constant-voltage charging is performed with the charge current reduced so as to prevent the voltage of the battery from exceeding this maximum voltage. Subsequently, when the charge current decreases to a given value, the charging is completed.

As show in FIG. 1, as charging progresses, the temperature of the secondary battery rises. This temperature rise does not significantly compromise the safety as long as the extent of the temperature rise of the secondary battery does not exceed 10° C. at an ambient temperature of 35° C., for example, i.e., as long as the temperature of the secondary battery is lower than or equal to 45° C.

When the capacity of the secondary battery increases, however, the extent of the temperature rise increases accordingly, as described above. In this case, when the temperature of the secondary battery exceeds 45° C., for example, the safety might be compromised.

To solve this problem, a secondary battery is charged while its temperature is measured. When the temperature of the secondary battery exceeds a given reference temperature (e.g., 45° C.), a value lower than the value set for the normal operation is used as the maximum voltage for the constant-voltage charging. This switching between the values is intended to ensure the safety of the secondary battery even at an excessive temperature rise.

Figure 2:
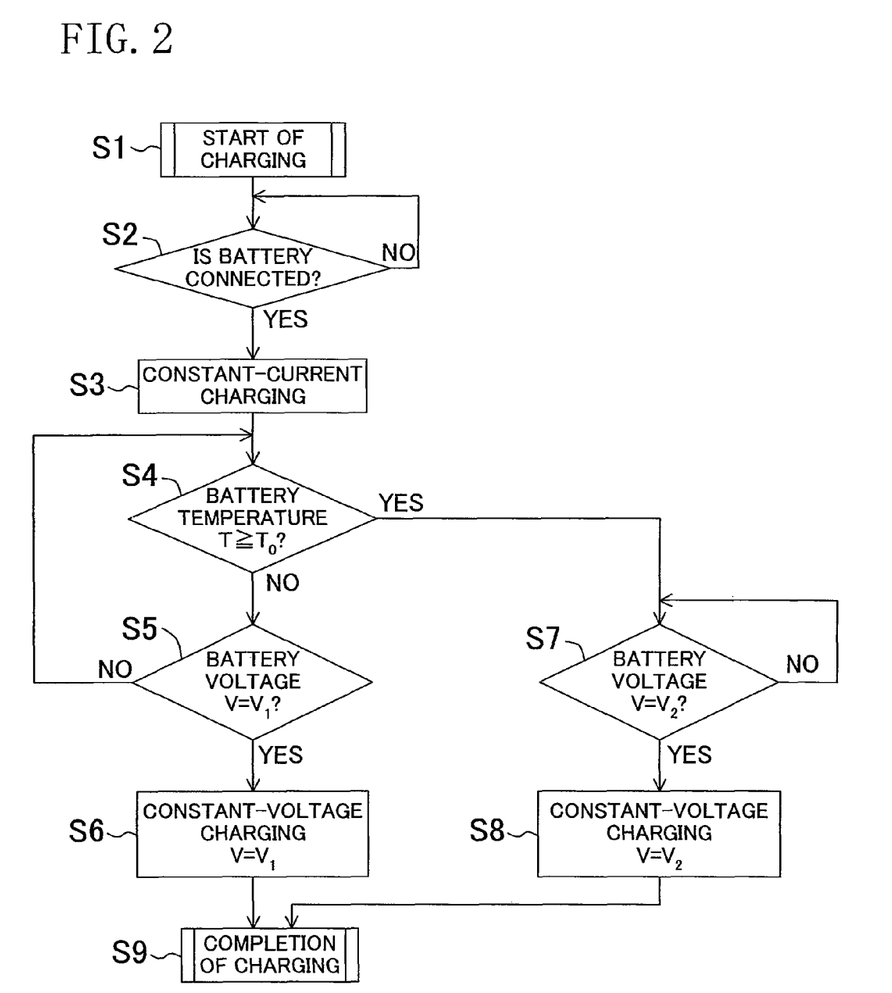
FIG. 2 is a flowchart showing a flow of a method for charging a secondary battery.

FIG. 2 is a flowchart showing a flow of a charging method in which charging control is performed based on the foregoing idea.

First, at the start of charging (step S1), it is determined whether a secondary battery is connected to a charger or not (step S2). This determination is generally made by detecting that the secondary battery is fitted to the charger. When the connection is detected, the secondary battery initiates constant-current charging in which the battery is charged with a constant current (step S3). During the charging, the temperature of the secondary battery is detected so as to determine whether the detected temperature reaches a given reference temperature ($T_0$) or not (step S4). When the detected temperature does not exceed the reference temperature ($T_0$), and when the voltage of the secondary battery reaches a given maximum voltage ($V_1$) (step S5), the constant-current charging transitions to constant-voltage charging (step S6). Then, when the charge current decreases to a given value, the charging is completed (step S9). Changes in charge current, charge voltage, detected temperature of the secondary battery, and charge capacity in this case are shown in FIG. 1.

On the other hand, if the detected temperature exceeds the reference temperature ($T_0$), the maximum voltage in the constant-voltage charging is switched to a value ($V_2$) lower than a usual set value ($V_1$). Subsequently, when the voltage of the secondary battery reaches the maximum voltage ($V_2$) (step S7), the constant-current charging transitions to constant-voltage charging (step S8). Thereafter, when the charge current decreases to a given value, the charging is completed (step S9).

Figure 3:
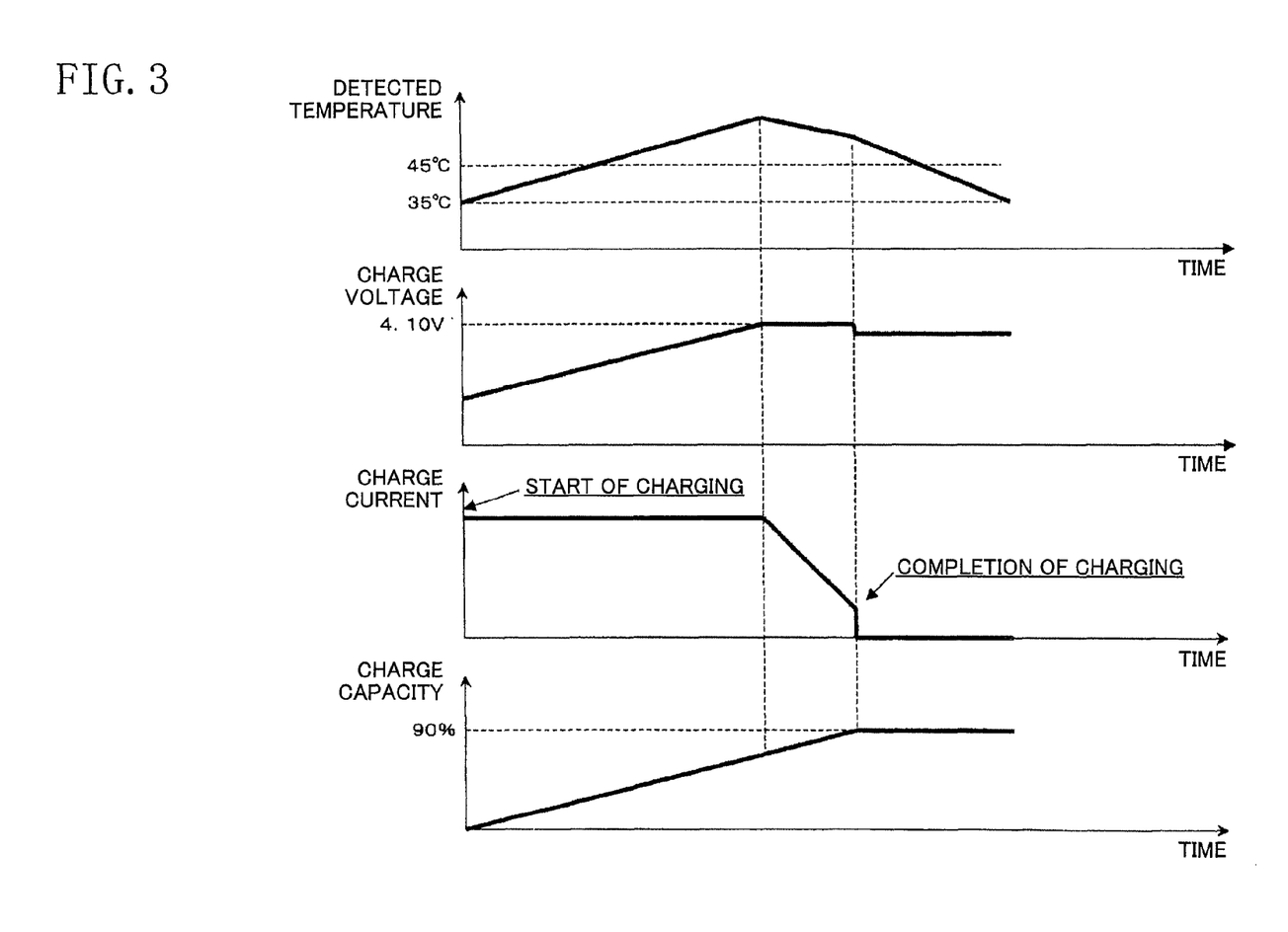
FIG. 3 shows graphs respectively showing changes in charge current, charge voltage, detected temperature of a secondary battery, and charge capacity after the start of charging and before the completion of the charging in a case where the detected temperature exceeds a reference temperature.

FIG. 3 shows graphs respectively showing changes in charge current, charge voltage, detected temperature of the secondary battery, and charge capacity after the start of charging and before the completion of the charging in a case where the detected temperature exceeds the reference temperature ($T_0$). As shown in FIG. 3, since the maximum voltage ($V_2$) in the constant-voltage charging is set to be lower than the maximum voltage ($V_1$) shown in FIG. 1, the charge capacity after the completion of charging is smaller than that in the case shown in FIG. 1. For example, in the case of a lithium ion battery, if the maximum voltage ($V_2$) is set to be lower than a usual set value (i.e., $V_1$=4.2 V), i.e., $V_2$=4.1 V, the charge capacity after the completion of charging in a case where the detected temperature exceeds the reference temperature ($T_0$) decreases to about 90%, assuming that the charge capacity after the completion of normal charging is 100%. Accordingly, the secondary battery charged under the foregoing conditions has a problem of a shorter operating time of electronic devices resulting from a decrease in the charge capacity.

The present invention was devised to solve this problem, and is intended to provide a charging method for both charging the battery safely and assuring a sufficient charge capacity even in the case of an excessive temperature rise of a secondary battery which is being charged.

An embodiment of the present invention will be described hereinafter with reference to the drawings. It should be noted that the present invention is not limited to the following embodiment. Various changes and modifications may be made without departing from the scope of the present invention as long as the same or similar advantages are obtained.

Figure 4:
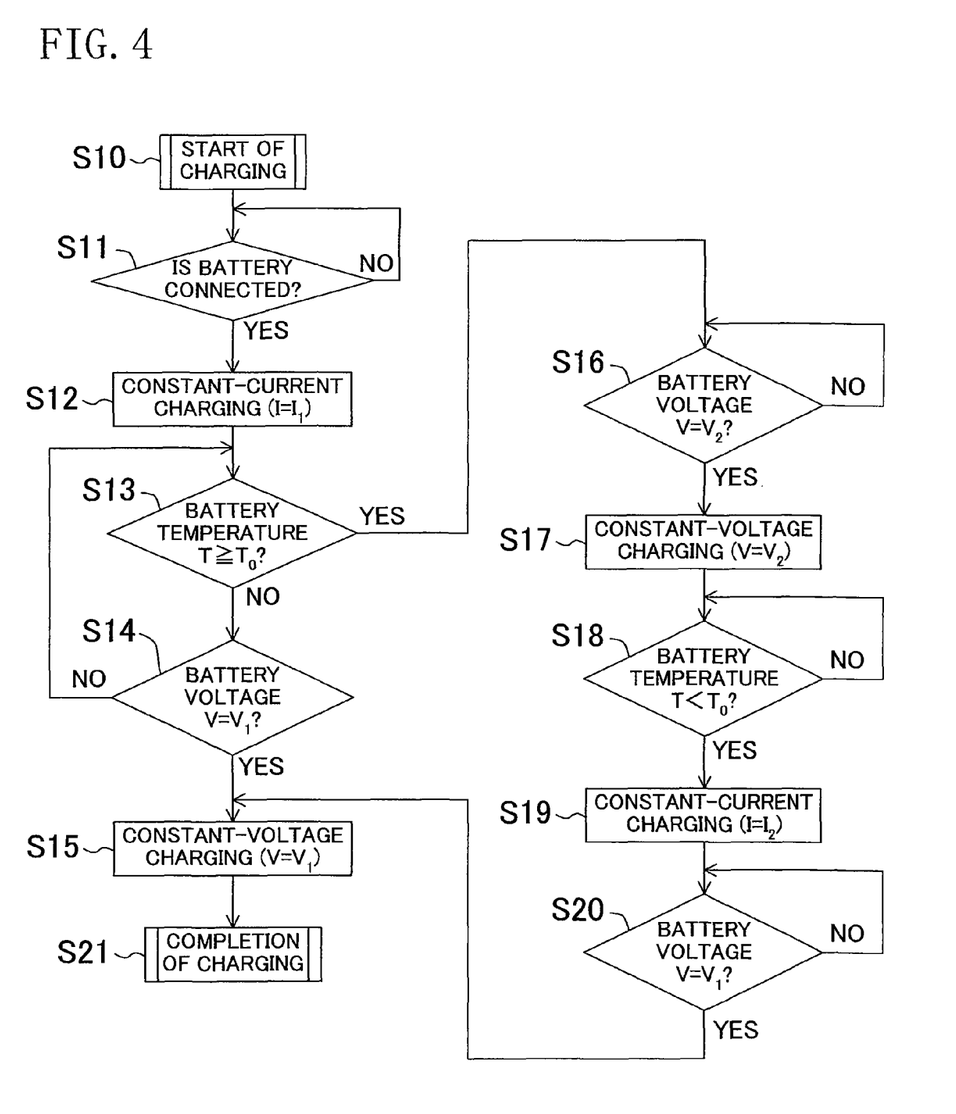
FIG. 4 is a flowchart showing a flow of a method for charging a secondary battery according to an embodiment of the present invention.

FIG. 4 is a flowchart showing a flow of a method for charging a secondary battery according to this embodiment.

First, at the start of charging (step S10), it is determined whether a secondary battery is connected to a charger or not (step S11). This determination is generally made by detecting that the secondary battery is fitted to the charger. When the connection is detected, the secondary battery initiates constant-current charging (where $I=I_1$) with a first current ($I_1$) (step S12). During charging, the temperature of the secondary battery is detected so as to determine whether the detected temperature reaches a given reference temperature ($T_0$) or not (step S13). If the detected temperature does not exceed the reference temperature ($T_0$), when the voltage of the secondary battery reaches a first voltage ($V_1$) (step S14), the constant-current charging (where $I=I_1$) transitions to constant-voltage charging (where $V=V_1$) (step S15). Then, when the charge current decreases to a given value, the charging is completed (step S21).

Figure 5:
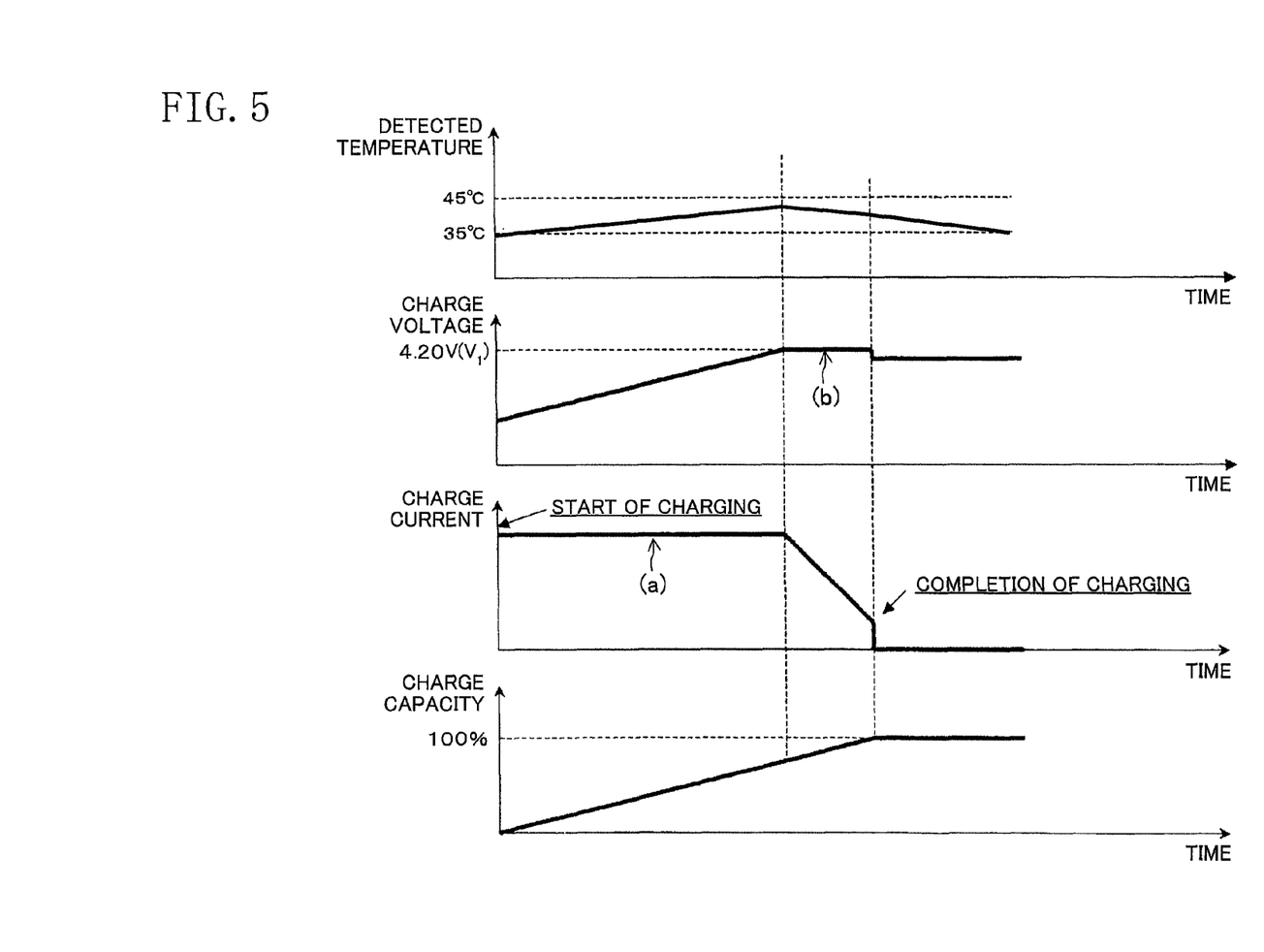
FIG. 5 shows graphs respectively showing changes in charge current, charge voltage, detected temperature of a secondary battery, and charge capacity after the start of charging and before the completion of the charging in the embodiment.

Changes in charge current, charge voltage, detected temperature of the secondary battery, and charge capacity in this case are shown in FIG. 5. In FIG. 5, the character (a) in FIG. 5 indicates the step corresponding to the constant-current charging (where $I=I_1$), whereas the character (b) indicates the step corresponding to the constant-voltage charging (where $V=V_1$).

On the other hand, if the detected temperature exceeds the reference temperature ($T_0$), the maximum voltage in the constant-voltage charging is switched to a value ($V_2$) lower than the usual set value ($V_1$). Subsequently, when the voltage of the secondary battery reaches the second voltage ($V_2$) (step S16), the constant-current charging transitions to constant-voltage charging (where $V=V_2$) (step S17). During the constant-voltage charging (where $V=V_2$), charge current gradually decreases, and accordingly, the temperature of the secondary battery also decreases. When the detected temperature becomes equal to or lower than the reference temperature ($T_0$), constant-current charging (where $I=I_2$) of the secondary battery is initiated with a second current ($I_2$) (step S19). Thereafter, the voltage of the secondary battery increases again from the second voltage ($V_2$), and when the voltage reaches the first voltage ($V_1$) (step S20), the constant-current charging (where $I=I_2$) transitions to constant-voltage charging (where $V=V_1$). Then, when the charge current decreases to a given value, the charging is completed (step S21).

Figure 6:
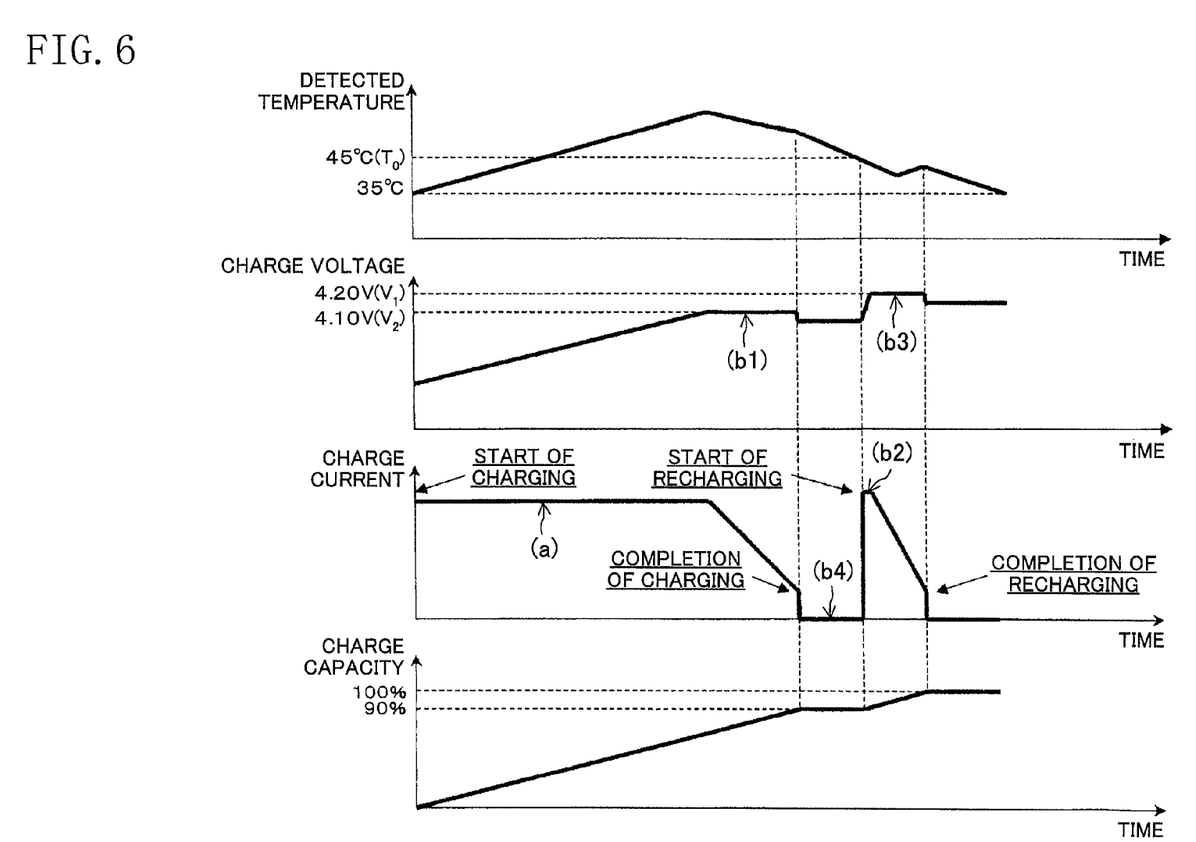
FIG. 6 shows graphs respectively showing changes in charge current, charge voltage, detected temperature of a secondary battery, and charge capacity after the start of charging and before the completion of the charging in the embodiment.

Changes in charge current, charge voltage, detected temperature of the secondary battery, and charge capacity in this case are shown in FIG. 6. In FIG. 6, the character (a) indicates the step corresponding to the constant-voltage charging (where $I=I_1$), whereas the character (b1) indicates the step corresponding to the constant-voltage charging (where $V=V_2$), the character (b2) indicates the step corresponding to the constant-voltage charging (where $I=I_2$), and the character (b3) indicates the step corresponding to the constant-voltage charging (where $V=V_1$).

The charging method of this embodiment employs, as a basic flow, step (a) of performing constant-current charging with a first current ($I_1$) and step (b) of, when the voltage of the secondary battery reaches a first voltage ($V_1$), performing constant-voltage charging (where $V=V_1$) at the first voltage ($V_1$). A feature of this charging method is that when the temperature of the secondary battery becomes equal to or higher than the reference temperature ($T_0$) in step (a) of performing constant-current charging (where $I=I_1$), step (b) of performing constant-voltage charging (where $V=V_1$) is switched to the following steps.

Specifically, when the temperature of the secondary battery becomes equal to or higher than the reference temperature ($T_0$), step (b) is switched to steps (b1), (b2), and (b3). Step (b1) is the step of performing constant-voltage charging (where $V=V_2$) at the second voltage ($V_2$) when the voltage of the secondary battery reaches the second voltage ($V_2$) lower than the first voltage ($V_1$). Step (b2) is the step of performing constant-current charging (where $I=I_2$) with the second current (where $I=I_2$) when the temperature of the secondary battery falls below the reference temperature ($T_0$) after step (b1). Step (b3) is the step of performing constant-voltage charging (where $V=V_1$) at the first voltage ($V_1$) when the voltage of the secondary battery reaches the first voltage ($V_1$).

By employing the foregoing steps after the switching, the charge capacity after the completion of charging is made substantially equal to the charge capacity in the case of normal charging, i.e., in a case where charging is completed before the secondary battery which is being charged reaches the reference temperature ($T_0$), as shown in FIG. 6. Accordingly, even in the case of an excessive temperature rise of the secondary battery which is being charged, it is possible to charge the battery without compromising the safety, while assuring a sufficient charge capacity.

In the present disclosure, the amounts of the "first current ($I_1$)" and the "second current ($I_2$)" in constant-current charging are not specifically limited, and may be equal to, or different from, each other. The charging with the second current ($I_2$) is not necessarily constant-current charging. In the present disclosure, the levels of the "first voltage ($V_1$)" and the "second voltage ($V_2$)" in constant-voltage control are not specifically limited, but the difference between $V_1$ and $V_2$ is preferably in the range from 0.1 V to 0.2 V. For example, in a case where the secondary battery is a lithium ion battery, the voltages are typically set as $V_1$=4.2 V, and $V_2$=4.1 V. The "reference temperature ($T_0$)" is not specifically limited, but is preferably higher than the ambient temperature by about 10° C. For example, as shown in FIG. 6, when the ambient temperature is 35° C., the reference temperature ($T_0$) is preferably 45° C. For safety reasons, it is preferable to increase the difference between the first voltage ($V_1$) and the second voltage ($V_2$) as the difference between the reference temperature ($T_0$) and the ambient temperature increases. For example, in a case where the ambient temperature is 35° C. and the reference temperature ($T_0$) is set at 50° C., if the first voltage ($V_1$) is 4.2 V, the second voltage ($V_2$) is preferably set at, for example, 4.0 V.

In addition, as shown in FIG. 6, step (b4) of stopping charging may be provided between step (b1) of performing constant-voltage charging (where $V=V_2$) at the second voltage ($V_2$) and step (b2) of performing constant-current charging (where $I=I_2$) with the second current ($I=I_2$). In this case, it appears that charging is temporally stopped at step (b1), then recharging is started at step (b2), and then the recharging is completed at step (b3).

Figure 7:
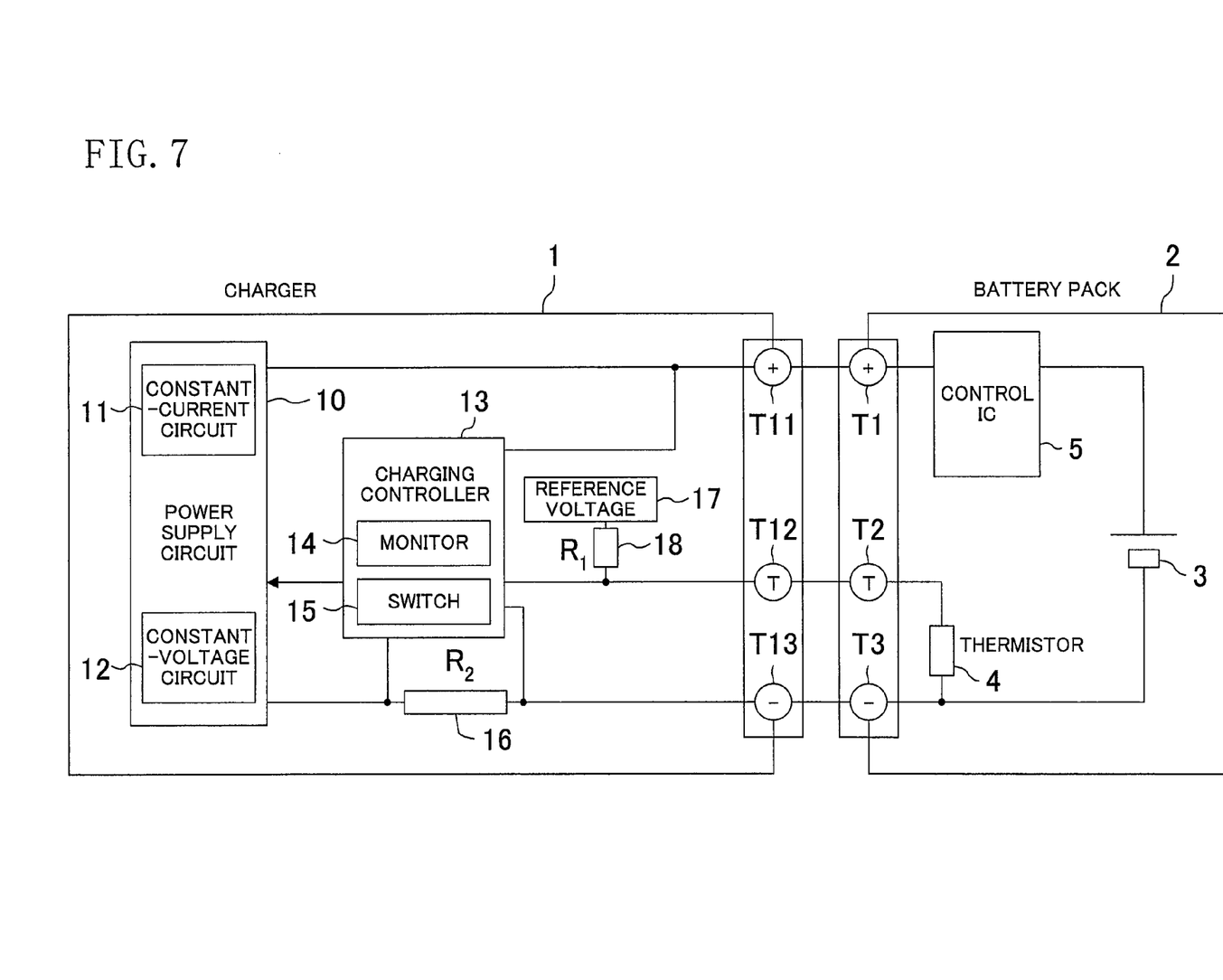
FIG. 7 is a block diagram illustrating a configuration of a charger according to an embodiment.

A charger according to an embodiment of the present invention will now be described with reference to FIG. 7. FIG. 7 is a block diagram illustrating a configuration of the charger of this embodiment. The charger of this embodiment is a charger capable of implementing charging with the inventive charging method described above.

As illustrated in FIG. 7, the charger 1 includes: a power supply circuit 10 including a constant-current circuit 11 for performing constant-current charging and a constant-voltage circuit 12 for performing constant-voltage charging; and a charging controller 13 for controlling charging of the power supply circuit 10. The charging controller 13 includes: a monitor 14 for monitoring the temperature of the secondary battery; and a switch 15 for switching a charge voltage in constant-voltage charging between a first voltage ($V_1$) and a second voltage ($V_2$) lower than the first voltage ($V_1$), based on the temperature of a secondary battery detected by the monitor 14.

A battery pack 2 includes: a secondary battery 3; a thermistor 4 for detecting the temperature of the secondary battery 3; and a control IC 5 for detecting the voltage of the secondary battery 3, and controlling protection of the secondary battery 3 against abnormal conditions such as an overvoltage and an overdischarge voltage. When the battery pack 2 is fitted to the charger 1, terminals T1 and T3 of the battery pack 2 are respectively connected to terminals T11 and T13 of the charger 1 so that the secondary battery 3 is charged by the power supply circuit 10. A terminal T2 of the battery pack 2 is connected to a terminal T12 of the charger 1 so that the monitor 14 of the charger 1 monitors the temperature of the secondary battery 3 which is being charged.

During constant-current charging with the first current ($I_1$), when the temperature of the secondary battery 3 measured by the monitor 14 becomes equal to or higher than the reference temperature ($T_0$), the charger 1 operates in the following manner. When the temperature of the secondary battery 3 becomes equal to or higher than the reference temperature ($T_0$), the switch 15 performs constant-voltage charging at the second voltage ($V_2$). Thereafter, when the temperature of the secondary battery 3 falls below the reference temperature ($T_0$), constant-current charging is performed with the second current ($I_2$). Subsequently, when the voltage of the secondary battery 3 reaches the first voltage ($V_1$), the switch 15 performs constant-voltage charging at the first voltage ($V_1$).

In FIG. 7, reference numeral 16 denotes a charge-current detection resistor $R_2$, reference numeral 17 denotes a reference-voltage regulator, and reference numeral 18 denotes a voltage dividing resistor $R_1$.

The foregoing description refers to preferred embodiments of the present invention. However, the foregoing description does not limit the present invention, and various modification may be made, of course. For example, the secondary battery is a lithium ion battery in the above embodiment. Alternatively, a nickel-metal hydride battery or a nickel-cadmium battery may be used, for example.

In the present disclosure, the "secondary battery" is not limited to a single secondary battery, and includes a battery pack in which a plurality of secondary batteries are connected in series or in parallel.

INDUSTRIAL APPLICABILITY

The present invention is useful for chargers for secondary batteries having excellent safety and capable of assuring a sufficient charge capacity.

The invention claimed is:

1. A charging method for charging a secondary battery, the method comprising the steps of:
   (a) performing constant-current charging with a first current;
   (b) when, under a condition that a temperature of the secondary battery is less than a reference temperature, a voltage of the secondary battery reaches a first voltage, performing constant-voltage charging at the first voltage, wherein:
   when the temperature of the secondary battery is equal to or higher than the reference temperature in step (a), performing steps of:
     (b1) when the voltage of the secondary battery reaches a second voltage lower than the first voltage, performing constant-voltage charging at the second voltage,
     (b2) after step (b1) and when the temperature of the secondary battery falls below the reference temperature, performing charging with a second current, and
     (b3) when the voltage of the secondary battery reaches the first voltage, performing constant-voltage charging at the first voltage, and
   the first current is different from the second current.

2. The charging method of claim 1, further comprising the step of stopping charging between steps (b1) and (b2).

3. The charging method of claim 1, wherein a difference between the first voltage and the second voltage is in the range from 0.1 V to 0.2 V.

4. The charging method of claim 3, wherein the secondary battery is a lithium ion secondary battery,
   the first voltage is 4.2 V, and
   the second voltage is 4.1 V.

5. A charger for charging a secondary battery, the charger comprising:
   a power supply circuit configured to perform constant-current charging with a first current, and when a voltage of the secondary battery reaches a first voltage, perform constant-voltage charging at the first voltage; and
   a charging controller configured to control charging by the power supply circuit, wherein:
   the charging controller includes:
     a monitor configured to monitor a temperature of the secondary battery; and
     a switch configured to switch a charge voltage in constant-voltage charging between the first voltage and a second voltage lower than the first voltage, based on the temperature of the secondary battery detected by the monitor, and
   when, under a condition that the temperature of the secondary battery is less than a reference temperature, the voltage of the secondary battery reaches the first voltage by the constant-current charging with the first current, the switch switches from the constant-current charging to constant-voltage charging at the first voltage,
   when, during the constant-current charging with the first current, the temperature of the secondary battery detected by the monitor is equal to or higher than a reference temperature, the switch switches from the constant-current charging to constant-voltage charging at the second voltage, then when the temperature of the secondary battery falls below the reference temperature, the charging controller allows the secondary battery to be charged with a second current, and then when the voltage of the secondary battery reaches the first voltage, the switch switches to constant-voltage charging at the first voltage, and
   the first current is different from the second current.

* * * * *